United States Patent
Klus et al.

(10) Patent No.: US 11,461,186 B2
(45) Date of Patent: Oct. 4, 2022

(54) AUTOMATIC BACKUP STRATEGY SELECTION

(71) Applicant: SAP SE, Walldorf (DE)

(72) Inventors: Benedikt Klus, Hamburg (DE); Henrik Hempelmann, Havelberg (DE); Anne Roessiger, Berlin (DE); Stefan Voss, Potsdam (DE); Martin Brunzema, Berlin (DE)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 16/870,200

(22) Filed: May 8, 2020

(65) Prior Publication Data

US 2021/0349785 A1    Nov. 11, 2021

(51) Int. Cl.
*G06F 11/14*     (2006.01)
*G06F 11/34*     (2006.01)

(52) U.S. Cl.
CPC ...... *G06F 11/1464* (2013.01); *G06F 11/1448* (2013.01); *G06F 11/1461* (2013.01); *G06F 11/1469* (2013.01); *G06F 11/3423* (2013.01); *G06F 2201/80* (2013.01)

(58) Field of Classification Search
CPC ............. G06F 11/1464; G06F 11/1448; G06F 11/1461; G06F 11/1469; G06F 11/3423; G06F 2201/80
See application file for complete search history.

(56) References Cited

U.S. PATENT DOCUMENTS

| | | | | |
|---|---|---|---|---|
| 5,758,359 A | * | 5/1998 | Saxon | G06F 11/1461 707/644 |
| 9,460,399 B1 | * | 10/2016 | Stacey | G06F 9/46 |
| 9,471,245 B1 | * | 10/2016 | Shilane | G06F 11/1458 |
| 9,519,432 B1 | * | 12/2016 | Haustein | G06F 11/1458 |
| 10,810,089 B1 | * | 10/2020 | Gu | G06F 16/113 |
| 10,838,912 B1 | * | 11/2020 | Chopra | G06F 11/1451 |
| 2005/0216110 A1 | * | 9/2005 | Chen | G05B 19/41865 700/99 |
| 2006/0004890 A1 | * | 1/2006 | Semple | G06F 16/10 |
| 2008/0034370 A1 | * | 2/2008 | Huizenga | G06F 9/5027 718/104 |
| 2009/0172047 A1 | * | 7/2009 | Boyko | G06F 16/254 |
| 2011/0022879 A1 | * | 1/2011 | Chavda | G06F 11/0793 714/1 |

(Continued)

*Primary Examiner* — Kamini B Patel
(74) *Attorney, Agent, or Firm* — Buckley, Maschoff & Talwalkar LLC

(57) ABSTRACT

A system and method to receive, from a database service executing on a cloud infrastructure, information indicating metrics regarding backups for the database service, the information including at least an indication of an age of a last complete backup for the database service, an indication of a size of changed data since the last complete backup, and an indication of a number of data units changed since the last complete backup; determine a type of backup strategy to instruct the database service to perform based on the received information, the type of backup strategy being one of a complete backup of the database service, a delta backup of the database service, and no backup of the database service; and issue, in response to the determination, an instruction to the database service to execute the determined type of backup.

19 Claims, 7 Drawing Sheets

(56) References Cited

U.S. PATENT DOCUMENTS

| | | | |
|---|---|---|---|
| 2012/0304191 A1* | 11/2012 | Morgan | G06F 9/5088 |
| | | | 718/105 |
| 2016/0147616 A1* | 5/2016 | Schefe | G06F 16/116 |
| | | | 707/684 |
| 2018/0054395 A1* | 2/2018 | Carey | G06F 9/455 |
| 2018/0060176 A1* | 3/2018 | Thakkar | G06F 9/45558 |
| 2020/0026428 A1* | 1/2020 | Vithalkar | G06F 3/065 |
| 2020/0092334 A1* | 3/2020 | Hiebert | G06F 11/1461 |
| 2020/0250047 A1* | 8/2020 | Pascale | G06F 11/1469 |
| 2021/0117283 A1* | 4/2021 | Wang | H04L 67/1001 |
| 2021/0303416 A1* | 9/2021 | Brenner | G06F 11/1451 |

* cited by examiner

AUTOMATIC BACKUP STRATEGY SELECTION

BACKGROUND

A number of large cloud infrastructure and service providers have emerged to provide the infrastructure to support customers in need of robust and reliable storage and compute needs. A benefit offered by these providers is that they are highly scalable, responsive to their customers' increasing storage and processing needs. These large cloud infrastructure and service providers, also referred to as hyperscalers, may provide the hosting infrastructure for different types of services, including for example, a database service. An important aspect of providing a database service is providing backup and recovery processes to protect the database service against data losses and to reconstruct the database in the event of, for example, a data loss or other data inconsistency. In some aspects, a cloud backup service may provide a number of advantages and benefits, including, for example, assured access to the data, automated backup and management thereof, secure and affordable backups, as well as quick data restorations.

A simple strategy for backing up a database service is to perform full backups of the database at regular intervals (e.g., daily). While such as strategy may be able to restore the database service to the previous day's state (i.e., 24 hours old data), such a strategy might not be optimized to be efficient in terms of the use of resources (e.g., administrative overhead, memory, processing, and storage consumption, etc.) and time. Regarding backup and recovery processes in general, there may be a trade-off in terms of costs (e.g., memory, processing, data storage costs, etc.) and the time it takes to perform a complete data recovery from data backups.

Accordingly, there exists a need for an efficient and intelligent process and system to determine and select a backup strategy to ensure cost optimized operations for a database in a cloud environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
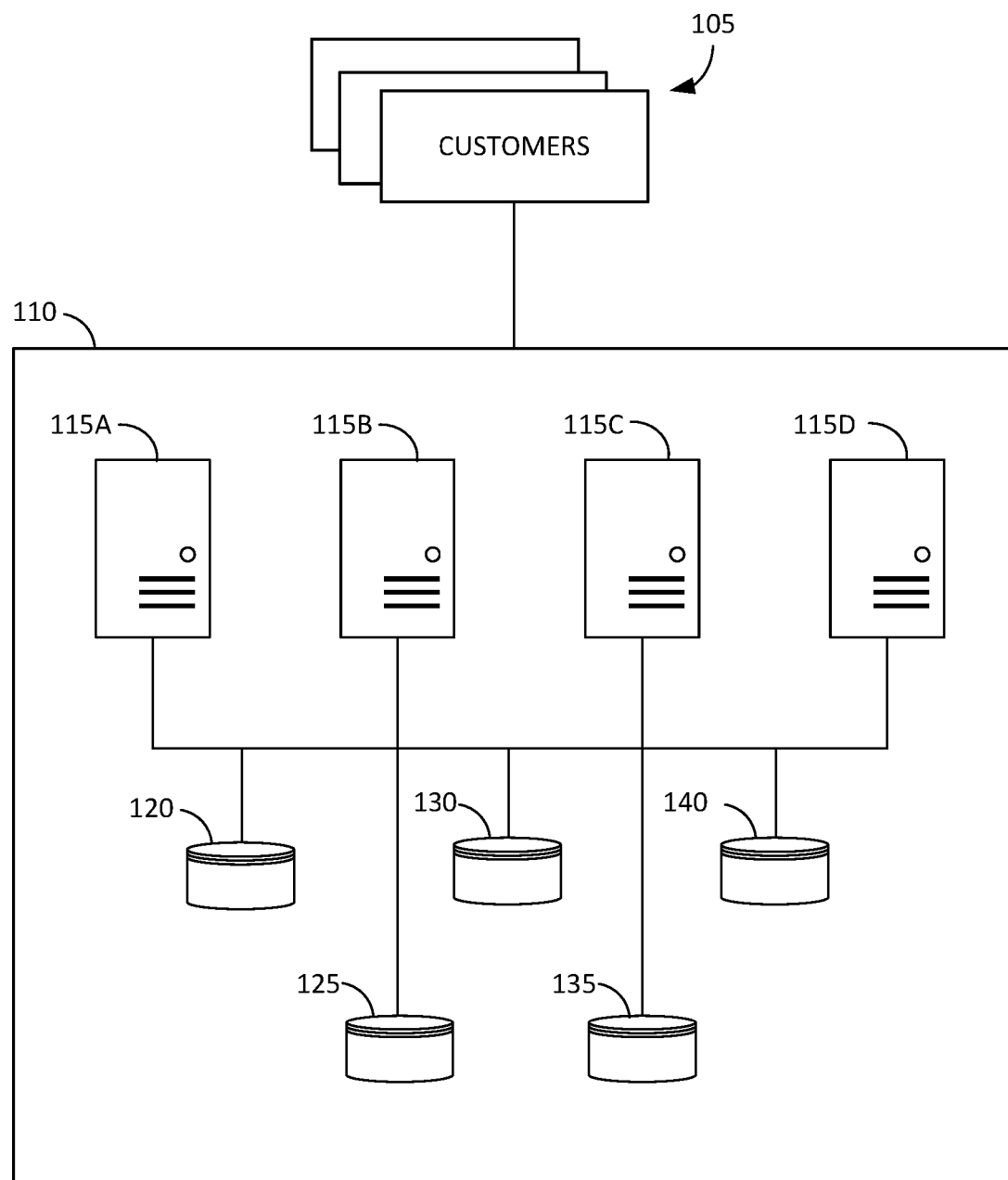
FIG. 1 is an illustrative block diagram of a hyperscaler environment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers provide cloud storage and compute infrastructures on a scale (i.e., size and extent) that far exceeds that of typical, conventional data centers. Hyperscalers may provide, maintain, and upgrade the infrastructure, including hardware, (customized) software, facilities, power management systems, etc. to provide services to customers with improved uptime. While Hyperscalers might provide a number of different services to end users (e.g., customers), aspects related to the determination and selection of a backup strategy for a database service provided in a cloud environment are, in some embodiments, significant to the present disclosure.

FIG. 1 is a high level illustrative depiction of a hyperscaler architecture 100, in accordance with an embodiment herein. A hyperscaler 110 includes all of the hardware, software, networks, facilities, energy management systems, and other operational aspects, whether custom or commodity acquisitions, to enable and support large cloud infrastructure and services for large numbers of users 105 (e.g., millions of customers of hosted services). All of these different aspects of the hyperscaler are not shown in FIG. 1. FIG. 1 includes illustrative representations of the many (e.g., >100,000) servers and storage devices implemented by the example hyperscaler to support the massive storage and compute capabilities of the its cloud infrastructure. Shown are servers 115A, 115B, 115C, and 115D that are networked to each other and to data storage devices/systems 120, 125, 130, 135, and 140. The servers and data storage devices depicted in FIG. 1 may include redundancies of some or all of each other to provide, in conjunction with certain executable processes, the reliability and resiliency of the hyperscaler environment 100. Additionally, FIG. 1 is an illustrative, figurative representation of hyperscaler servers and data storage devices/systems, as opposed to an actual physical or logical configuration thereof. In some aspects, the features of the present disclosure are not limited to any particular configuration or implementation of a hyperscaler or other cloud environment.

Hyperscaler 100 may host a database for one or more of customers 105 in the cloud provided by its cloud infrastructure, where the database is provided as a service to the customers (i.e., Database-as-a-Service, DBaaS). In some aspects, the database offered by hyperscaler 100 stores backups for database service instances in an object storage where the backups (i.e., data) are stored as distinct "objects". Referring to the example of FIG. 1, the object storage may be provided and maintained by the storage devices/systems 120, 125, 130, 135, and 140, in part and/or different combinations. The backups might be used in a recovery process to restore the database service instance to a particular point in time.

In some aspects, a hyperscaler database service provider may provide cloud infrastructure and database services to customer users thereof. A backup service may be offered by the database service provider to determine and manage the selection and administration of backup and recovery processes for the database services provided by the database service provider. The backup service can be further configured to issue commands or requests to the database service to execute the backup strategy determined by the backup service, wherein the database service may proceed to create the specified backup type and store the backup in the database service's storage device or system.

In some instances, a full or complete data backup for a database service might be scheduled to execute after a static timespan (e.g., every day). Performing a complete or full data backup will "freeze" the content of the backup into a backup file, which is a representation of the state of the database at the point in time that the data backup process started. Log backups are created for the database service and include a log of all of the transactions created on the database, where each and every change creates a log entry that is saved in the log backup. With the backup strategy that executes complete backups every day, a recovery process will restore the last complete backup and restore the log backups recorded in the interim since the last complete data backup (i.e., ≤24 hours). The recovery will include a limited set of log backups, not more than 24 hours of log backups. If a recovery is performed for a longer period of time, there will be a newer complete backup and the recovery time can still be performed quickly with the latest, complete backup and a limited set of log backups. Note that in some use-cases, little or no data may have changed on the database since the last complete backup. Notwithstanding this fact, the complete backup is performed every day regardless of the load on the database. Such a backup strategy may very well assure that the database can be recovered to a recent point in time (i.e., ≤24 hours) based on the daily backups.

A number of costs can be associated with a data recovery process, including, for example, resources costs such as memory, processing (e.g., CPU), and storage consumption and the time it takes to complete a recovery. The time it takes to complete a recovery for a database service by a database service may be captured in and referred to as the recovery time objective (RTO), which is a targeted duration of time for restoring the database service. The RTO metric may be viewed as a complement to a recovery point objective (RPO), which refers to the maximum period of time that data might be lost. These two metrics might together describe the acceptable performance for the database service in terms of time lost (RTO) and in terms of data lost or not backup during that period of time (RPO). The RTO and RPO might be specified in a service-level agreement between the database service provider and a customer thereof (i.e., client).

In some aspects, the execution of complete backups when not required to achieve RTO and RPO goals may be an extraneous use of database resources and time. In some embodiments, an efficient, reliable, and robust system and process is disclosed herein that may automatically determine and select a backup strategy to optimize the time and resources (i.e., costs) associated with data backup and recovery processes in a cloud environment. The disclosed system and process may determine and select the backup strategy to be executed by a database service based on an actual workload on the database. In general, a database service herein may request or query a database service to receive information indicative of metrics for the state of the database including, for example, the amount of data pages (or other units of data, e.g., blocks, chunks, etc.) to be backed up, determine or calculate a backup strategy based on the received information and the costs to perform a backup for this database, and provide the determined backup strategy to the database service in advance of the database service executing the backup. In some embodiments, the type of backup may be one of a complete backup, a delta backup that backs up only the changes occurring since the last complete (i.e., full) backup, or no backup, depending on the actual workload on the database.

Figure 2:
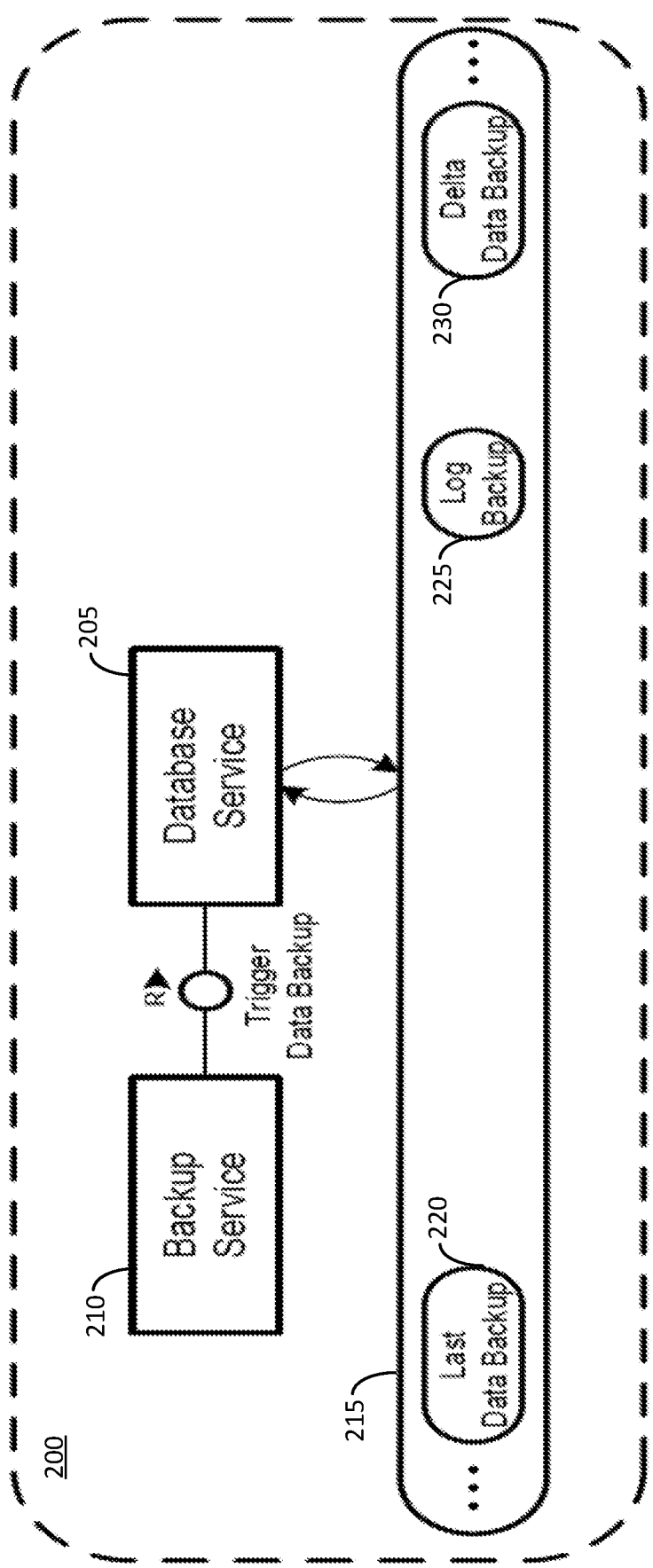
FIG. 2 is an illustrative block diagram of a backup strategy for a low data workload on a database service in a cloud environment, in accordance with an example embodiment.

FIG. 2 is an illustrative schematic block diagram of a backup strategy for a low data workload on a database in a cloud environment 200, in accordance with an example embodiment. Cloud environment 200 may be provided by a hyperscaler or other entity providing the infrastructure to support a database service 205 in the cloud. The database service provider may further provide a backup service 210 that interfaces with database service 205 to communicate instructions or requests to the database service regarding a backup strategy to be executed by the database service.

In some embodiments, a database provided by a database service provider herein may provide and support the creation, storage, and retrieval of a delta backup. As used herein, a delta backup captures the data changed on a database since the last full backup. As an example of a delta backup, a database service will only write the data pages that have changed due to transactional changes since a last complete backup to storage In some embodiments herein, a backup service may implement the arbitration coding, that is, the administration of the backups, and the determination of a backup strategy regarding a given database service based on the workload information received from the database service. Accordingly, the backup service may perform all of the evaluation(s) and backup strategy determination(s) for the specific database service and further provide an instruction, command, or request to the database service to trigger the execution of the selected backup strategy by the database service. The database service may be viewed as being "passive" or not active in the backup strategy determination.

Referring to FIG. 2, a low level of change traffic occurs on the database, wherein the database traffic is or close to being idle. This scenario might include an application or use-case where the database service is a read-only database and no data or just a few datasets are changed, where there are frequent requests for data that does not change the data or other situations. In this example scenario, a data storage facility 215 storing the backups is shown, wherein the relative space between objects in the storage space represents a timespan between the storage of the objects. As seen, data storage facility 215 includes a last (complete or full) data backup 220, the passage of some time before a log backup 225 due to the fact there is a very light workload on the database, and then a next delta backup at 230. In the example of FIG. 2, the timespan between complete backups may be an interval of multiple days (2 days, 5 days, or other interval), as opposed to a set interval of every day.

Backup service may request information from database service 205, including for example, the total data size of the database, the age of the last complete backup, and the number of log backups since the last complete backup. This information is received from the database service and represents the actual state of the database. In some embodiments, this or other information may be requested from the database service, including other information that might be used to calculate or otherwise determine these specific aspects of the database service and/or aspects of the database service. The requested information is used by backup service 210 in determining the backup strategy that should be executed by the database service to conserve costs while still achieving, for example, acceptable RTO and RPO objectives. In the example of FIG. 2, very fast recovery times may be guaranteed to a customer in case of a disaster even though backups (e.g., 220 and 230) are created every 3 or 4 days (or some other interval). For example, in a use-case where a database service provider may guarantee 14 days of data backups, the low data workload backup strategy illustrated in the example of FIG. 2 may lead to a significant (i.e., non-trivial) reduction in costs relative to a backup strategy that performs a complete backup every day because each complete/full backup operation costs CPU, memory, and storage space. In the example of FIG. 2 where there is not much change traffic on the database, the backup service selects a backup strategy that can skip daily backups without compromising data reliability.

Figure 3:
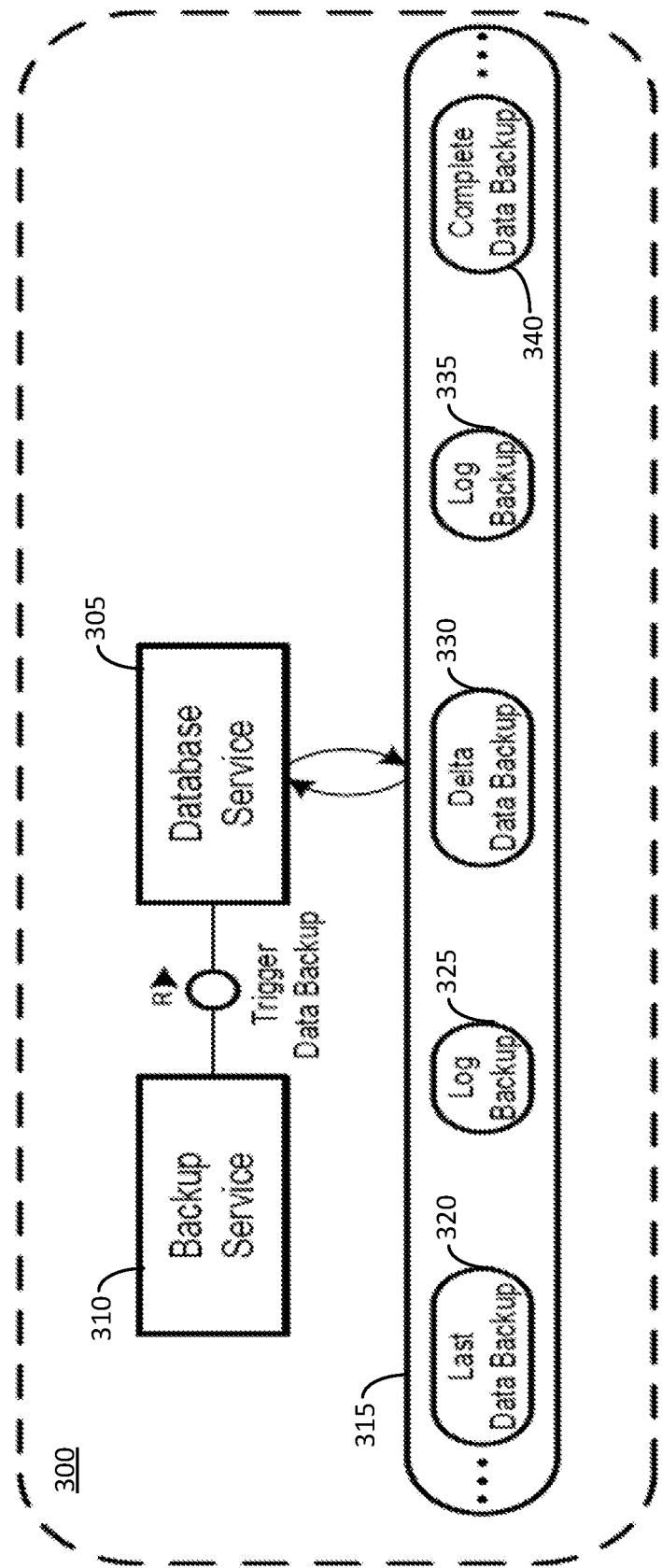
FIG. 3 is an illustrative block diagram of a backup strategy for a medium data workload on a database service in a cloud environment, in accordance with an example embodiment.

FIG. 3 is an illustrative schematic block diagram of a backup strategy for a database in a cloud environment 300 experiencing a medium data workload, in accordance with an example embodiment. Cloud environment 300 may be provided by a hyperscaler or other entity providing the infrastructure to support a database service 305 in the cloud and the database service provider may provide a backup service 310 that interfaces with the database service to communicate instructions or requests to the database service regarding a backup strategy to be executed thereby.

Backup service 310 may request information from database service 305, including for example, the total data size of the database, the age of the last complete backup, and the number of log backups since the last complete backup. This information is received from database service 310 and represents the actual state of the database at the time the request is received by the database service. This information may be requested and used by backup service 310 to determine the backup strategy that should be executed by the database service experiencing a medium data workload that conserve costs while still achieving, for example, acceptable RTO and RPO objectives. Note that log backups are written for each and every change, as mentioned above. Moreover, log backups are not influenced by modifying the frequency of complete/full backups herein. In the example of FIG. 3, backup service 310 may determine it is most cost-effective and efficient to generate, based on the information received from database service 305 and analyzed by the backup service to correspond to a medium level of database change traffic, delta backups between full/complete data backups.

In the example of FIG. 3, there is more activity on the database as compared to the example of FIG. 2. This fact is represented by, for example, the distance (i.e., timespan) between the last backup complete backup 320 and log backup 325. Due to the increased (i.e., "medium") level of change traffic on the database of FIG. 3 (database service 305), log backups (325, 335) in the example of FIG. 3 are generated more often than in the low data workload example of FIG. 2. Additionally, a delta backup 330 is generated to capture the data changes (e.g., data pages) that occur since the last data backup 320 and the next complete data backup 340.

In the example of FIG. 3 with a medium data workload as determined by backup service 310, after a last data backup 320 is written to storage 315, log backups (e.g., 325, 335) and delta backups (e.g., 330) are written to the storage between complete backups 320 and 340. The delta backup(s) capture just the actual data page changes since the last full backup (not all of the database data). For a recovery process for the example of FIG. 3, database service 305 may restore the last full backup (e.g., 320), log backups (e.g., 325, 335), and delta backups (e.g., delta backup 330), where the recovery is requested for a point in time after log backup 335 but before the complete data backup 340.

Figure 4:
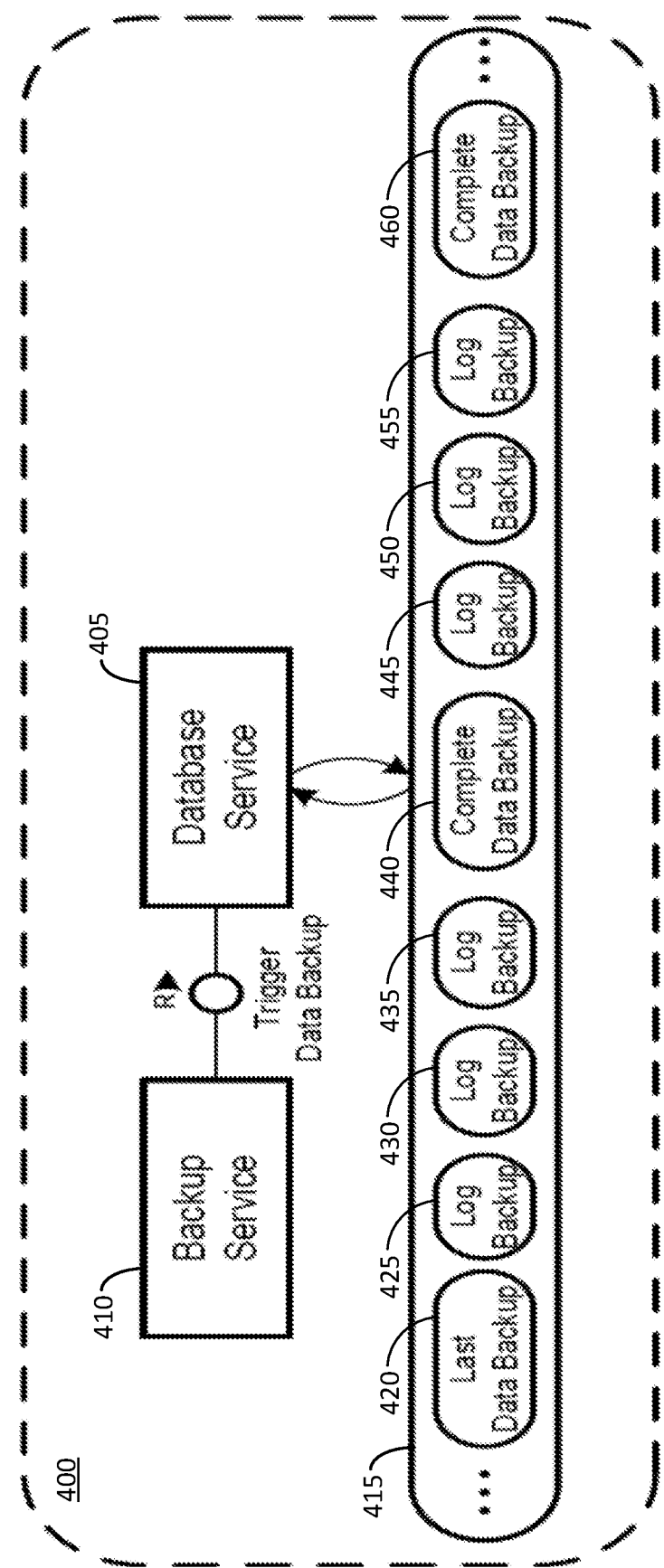
FIG. 4 is an illustrative block diagram of a backup strategy for a heavy data workload on a database service in a cloud environment, in accordance with an example embodiment.

FIG. 4 is an illustrative schematic block diagram of a backup strategy for a heavy data workload on a database service in a cloud environment, in accordance with an example embodiment. Cloud environment 400 may be provided by a hyperscaler or other entity providing the infrastructure to support a database service 405 in the cloud and the database service provider may provide a backup service 410 interfaced and in communication with the database service to send instructions or requests thereto regarding a backup strategy to be executed by the database service.

In some aspects, database service 405 may support and implement delta backups. However, due the size and frequency of change traffic on the database, the database service frequently writes and stores log backups to storage space 415. The log backups (e.g., 425, 430, 435, 445, 450, and 455) are so frequently generated because they the database is under a heavy data workload in the example of FIG. 4 and (by definition) they log all of the changes on the database. Accordingly, the log backups in FIG. 4 are generated rather quickly. Note that due to the large number of data changes (i.e., as indicated by the numerous log backups) and the amount or size of the data changes (i.e., heavy data workload), no delta backups are created and written to storage 415. Backup service 410 determines that writing delta backups for the heavy data workload scenario of FIG. 4 would not be beneficial or most cost-effective or efficient because the amount of data changes would result in large delta backups. As the size of the delta backups approaches the size of a complete backup, the costs and time savings that a delta backup might offer compared to a full backup diminishes. Thus, if a delta backup approaches the size of a full backup (i.e., exceeds some threshold value), little or no advantage may be had by writing to the delta backup. For example, in a recovery operation both the last complete backup and the delta backup must be recovered. If the delta backup approaches the size of the last complete backup, then the time to restore the database might approach being twice as long as just writing complete backups. Therefore, database service 410 may instruct or trigger database service 405 to write complete backups based on the workload on the database, where this backup strategy determination and selection is based on information received from the database service in front of the backup execution.

Figure 5:
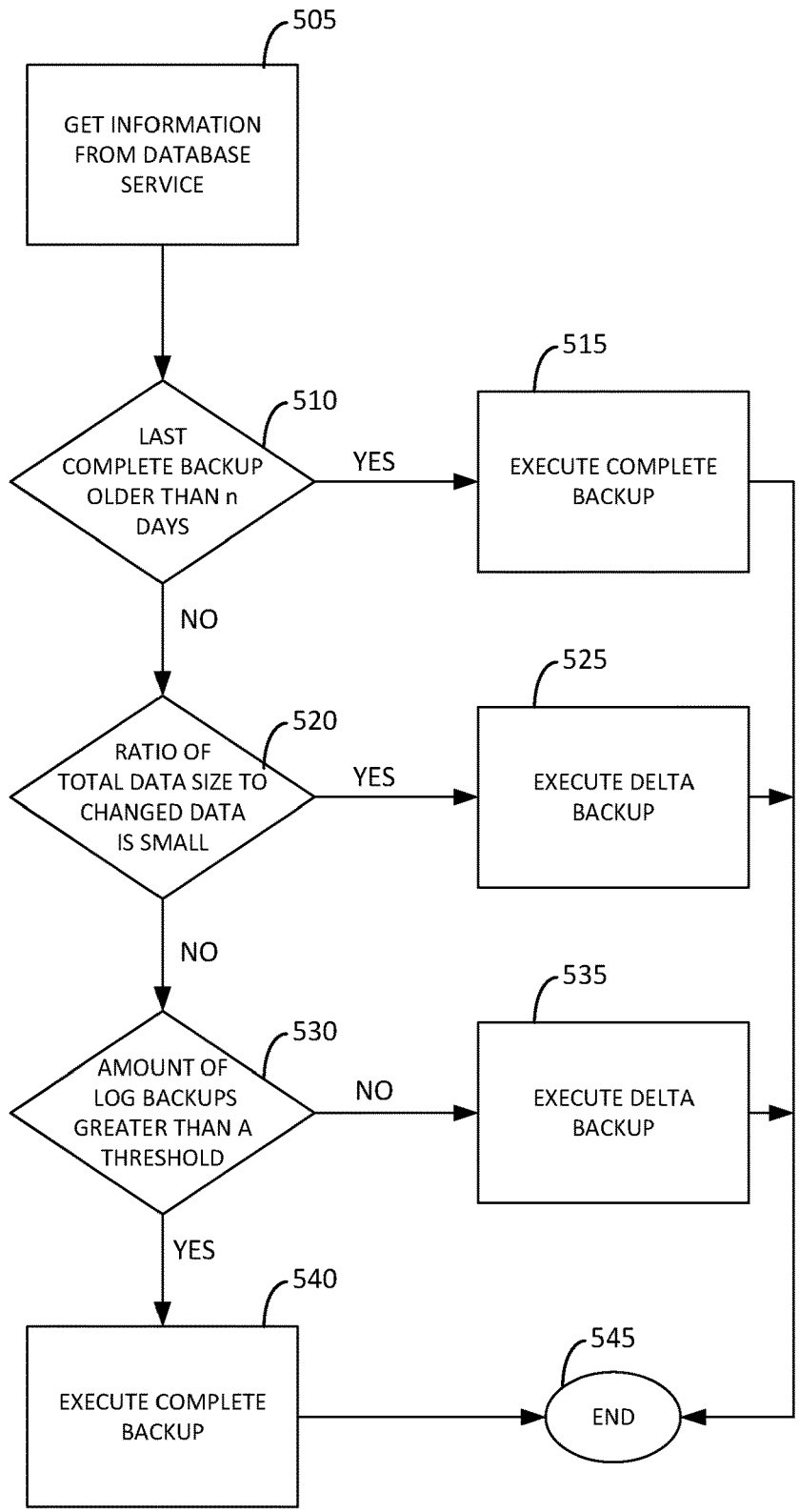
FIG. 5 is an illustrative flow diagram of a process for the selection of a backup strategy for a database service in a cloud environment, in accordance with an example embodiment.

FIG. 5 is an illustrative flow diagram of a process 500 for the selection of a backup strategy for a database service in a cloud environment, in accordance with an example embodiment. In some embodiments, process 500 may be implemented by one or more or aspects of a system such as those depicted in FIGS. 2-4. However, process 500 is not limited to being implemented by those particular systems or frameworks. At operation 505, a database service executing on a cloud infrastructure may receive information indicating metrics regarding backups for the database service. In some embodiments, the information may include at least an indication of an age of a last complete backup for the database service, a total size of the database, an indication of a size of changed data since the last complete backup, and an indication of a number of data units (e.g., blocks, pages, etc.) changed since the last complete backup. This information is received from the database service and may accurately represents a state of the database service. Namely, the information may be used to determine a workload on the database, either directly or by further processing and analysis of the received information. Other types of information may be received. This information may be used by a database backup service to determine a cost-effective and efficient backup strategy for the database based on a workload of the database.

At operation 510, as part of determining a backup strategy for a particular database service, the age of the last complete backup for the database service is determined. If the age of the last complete backup is greater than a threshold value n, then the backup strategy for the database service will be to write a new complete backup, as indicated at 515. Operation 510 may act to have a new complete backup generated notwithstanding other factors and considerations. The value n may be determined based on a number of factors and considerations, including but not limited to a service-level agreement between the database service provider and the customer of the database service. In the event, the last complete backup is not older than the threshold value n, then process 500 proceeds to operation 520.

At operation 520, a ratio of the total data size of the database and the size of the changed data may be evaluated. If this ratio is small, indicative of the size of the changes on the database being reasonably sized relative to the total data size of the database, then the backup service may trigger the database service to execute a delta backup. If however the ratio evaluated at operation 520 is not small, then process 500 proceeds to operation 530 from operation 520.

At operation 530, the amount of log backups is evaluated to determine whether they are greater than a threshold value (e.g., 1). If the number of log backups, as indicated in the information received from the database service, is determined to be greater than the threshold value for this particular evaluation, then process 500 proceeds to operation 540 and the backup service may trigger the database service to execute a complete backup. In the instance the number of log backups is determined not to be greater than the threshold value at operation 530, then the backup service may trigger the database service to execute a delta backup as shown at operation 535.

In all instances, after the determination of a particular backup strategy by the backup service and the backup service provides a signal, request, or instruction for the database service to execute the determined backup strategy, process 500 may terminate at 545. Process 500 may be reinitiated a next time a backup may possibly be performed by the database service.

Process 500 demonstrates, in some aspects, how the metrics used to determine the backup strategy may include the timespan since the last complete backup, the number of changes, and the number of resulting change pages. These factors may be used to determine the size of a backup. In some embodiments, these and other or fewer metrics might be used in a backup strategy determination.

In some aspects, a backup strategy determination process herein may be tuned, in some embodiments dynamically adjusted, in response to varying operating loads of a database. For example, in low data workload scenario, a backup service may write backups from time to time even if there is no traffic at all for, as an example, redundancy purposes.

In some embodiments, the metrics or other information considered in determining a backup strategy for a database service herein might include weighting the metrics relative to each other and further adjusting the weights assigned to each metric after one or more iterations. In some embodiments, the adjustments may be based on one or more of machine learning, artificial intelligence, and other techniques, alone or in combination.

Note that the actual costs of executing database backups may be a significant driver or concern in some embodiments herein. In some instances, a target may be to reduce the total cost of ownership and thus some embodiments might take into consideration the cost of storing backups, the cost of transferring backups, and the calculation of the actual time a recovery will take (e.g., a specified criteria in a service-level agreement). These factors and other factors might be part of the process to determine the backup strategy for a database service at a particular point in time.

Figure 6:
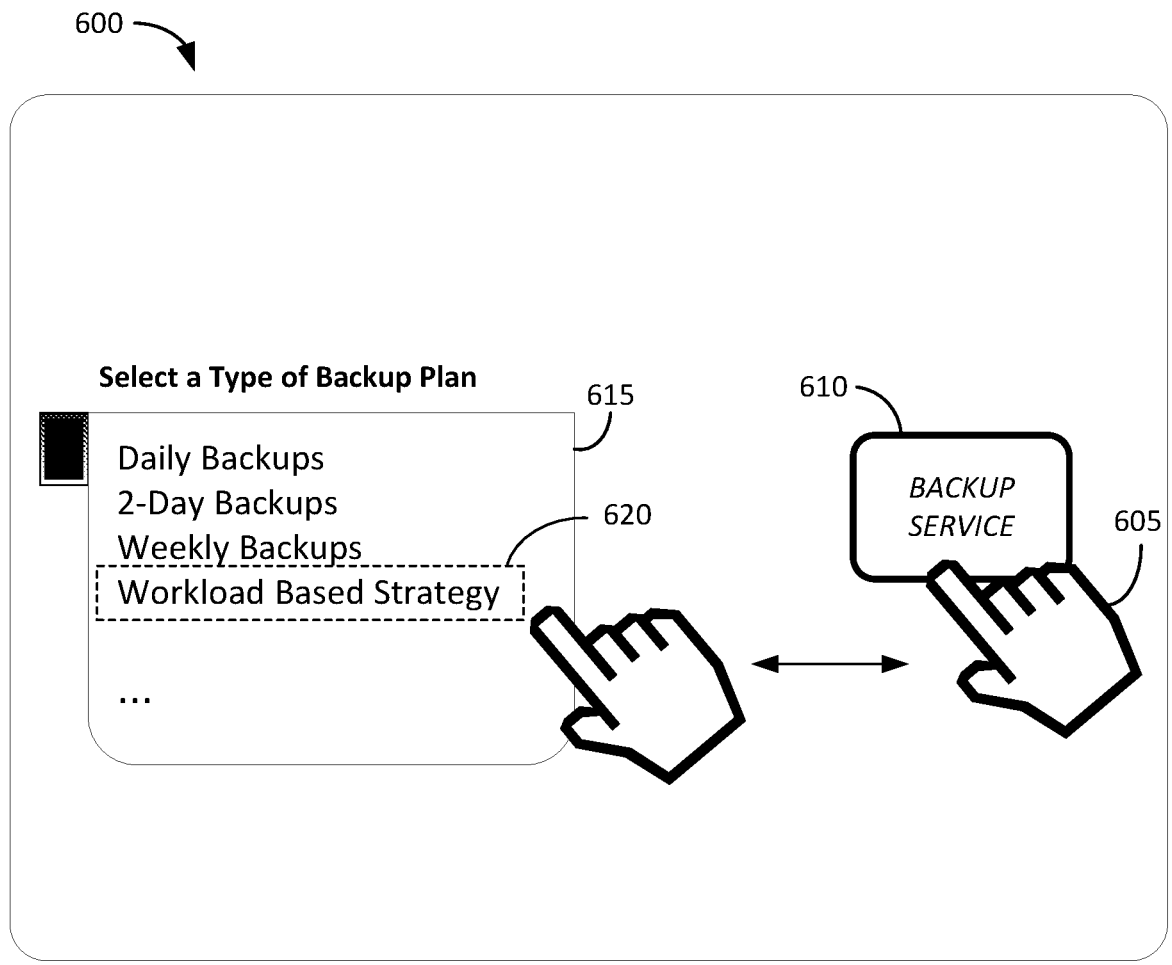
FIG. 6 is an outward facing user interface related to a system and process for selecting a backup strategy for a database service in a cloud environment, in accordance with an example embodiment.

FIG. 6 is an illustrative diagram of an outward facing user interface (UI) 600 related to a backup strategy determination and selection for a database service in a cloud environment, in accordance with an example embodiment. UI 600 may be displayed within a display device associated with a database backup service or a display device independent of the database service (e.g., a display of a device or system in communication with the database service over a network via a browser application). Selection of one or more UI elements (e.g., icons, buttons, drop-down menu options, etc.) by a touchscreen input, computer pointer 605, etc. may result in the initialization or continuance of a backup strategy for a database service in a cloud environment (e.g., the selection of "Backup Service" button 610). In the example of FIG. 6, UI 600 includes a UI element 615 for selecting a type of backup plan to be implemented via a drop-down menu that may facilitate selection and entry of a particular backup strategy, where the backups may all be done daily, every other day (i.e., 2-day backups), weekly, or performed based on a workload based strategy 620 as disclosed in some embodiments herein (e.g., FIGS. 2-5). The determination of the backup strategy itself may be automated.

Figure 7:
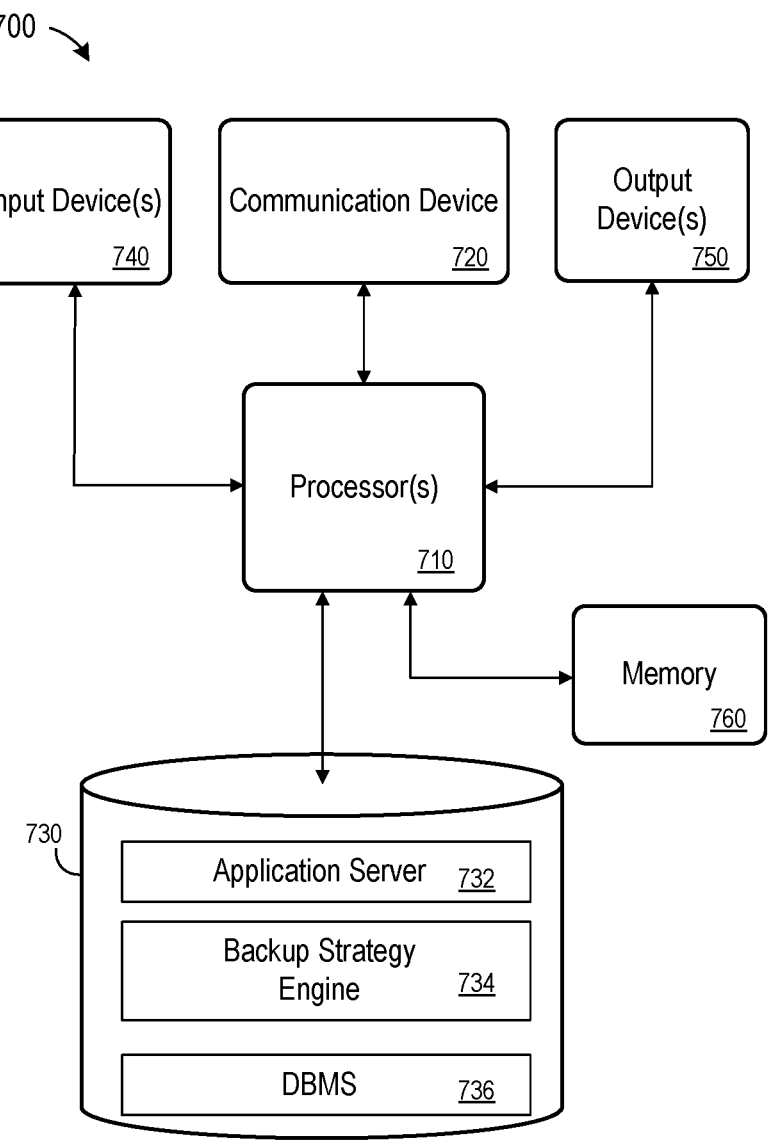
FIG. 7 is an illustrative block diagram of a computing system, in accordance with an example embodiment.

FIG. 7 illustrates a computing system 700 that may be used in any of the architectures or frameworks (e.g., FIGS. 2-4) and processes (e.g., FIG. 5) disclosed herein, in accordance with an example embodiment. FIG. 7 is a block diagram of server node 700 embodying a backup strategy determination and selection for a database service in a cloud environment, according to some embodiments. Server node 700 may comprise a general-purpose computing apparatus and may execute program code to perform any of the functions described herein. Server node 700 may comprise an implementation of at least some features of the architectures of FIGS. 2-4 in some embodiments. Server node 700 may include other unshown elements according to some embodiments.

Server node 700 includes processing unit(s) 710 operatively coupled to communication device 720, data storage device 730, one or more input devices 740, one or more output devices 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may each comprise program code executed by processor(s) 710 to cause server 700 to perform any one or more of the processes described herein. Backup service strategy engine 734 may execute one or more processes to implement a backup strategy determination and selection for a particular database service in a cloud environment. Embodiments are not limited to execution of these processes by a single computing device. Data storage device 730 may also store data and other program code for providing additional functionality and/or which are necessary for operation of server 700, such as device drivers, operating system files, etc. DBMS 736 may store and manage a variety of data types and structures, including, for example, master copies.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processor to execute the processor-executable program code in order to cause the system to:
   receive, from a database service executing on a cloud infrastructure, information indicating metrics regarding backups for the database service;
   determine, based on an analysis of a combination of the received information, a type of backup strategy to instruct the database service to perform, the analysis including:
   determine, based on an indication of an age of a last complete backup for the database service, whether to instruct the database service to perform a complete backup of the database service, where a complete backup of the database service is instructed in an instance the age of the last complete backup is greater than a first threshold;
   in an instance the age of the last complete backup is not greater than the first threshold, determine, based on a ratio of a total data size of a database of the database service and a size of changed data since the last complete backup, whether to instruct the database service to perform a delta backup of the database service, where a delta backup of the database service is instructed in an instance the ratio is less than a second threshold; and
   in an instance the ratio is greater than the second threshold, determine, based on an indication of a number of data units changed since the last complete backup, whether to instruct the database service to perform a complete backup of the database service or a delta backup of the database service, where a complete backup of the database service is instructed in an instance the number of data units changed since the last complete backup is greater than a third threshold value and a delta backup of the database service is instructed in an instance the number of data units changed since the last complete backup is less than the third threshold; and
   issue, in response to the determinations, an instruction to the database service to execute the determined type of backup.

2. The system of claim 1, wherein the processor is further configured to execute the processor-executable program code in order to cause the system to query the database service for the information indicating metrics regarding backups for the database service.

3. The system of claim 1, wherein the determination of the type of backup strategy to instruct the database service to perform is executed in advance of an execution of a data backup of the database service.

4. The system of claim 1, wherein the determination of the type of backup strategy to instruct the database service to perform is adjusted in response to a varying workload of the database service.

5. The system of claim 4, wherein the system is a backup service that interfaces with the database service.

6. The system of claim 1, wherein the information indicating metrics regarding backups for the database service query is representative of an actual state of the database service.

7. The system of claim 1, wherein the determination of the type of backup strategy to instruct the database service to perform is further based on a time to complete a recovery process for the database service.

8. A computer-implemented method, the method comprising:
receiving, from a database service executing on a cloud infrastructure, information indicating metrics regarding backups for the database service;
determining, based on an analysis of a combination of the received information, a type of backup strategy to instruct the database service to perform, the analysis including:
determining, based on an indication of an age of a last complete backup for the database service, whether to instruct the database service to perform a complete backup of the database service, where a complete backup of the database service is instructed in an instance the age of the last complete backup is greater than a first threshold;
in an instance the age of the last complete backup is not greater than the first threshold, determining, based on a ratio of a total data size of a database of the database service and a size of changed data since the last complete backup, whether to instruct the database service to perform a delta backup of the database service, where a delta backup of the database service is instructed in an instance the ratio is less than a second threshold; and
in an instance the ratio is greater than the second threshold, determining, based on an indication of a number of data units changed since the last complete backup, whether to instruct the database service to perform a complete backup of the database service or a delta backup of the database service, where a complete backup of the database service is instructed in an instance the number of data units changed since the last complete backup is greater than a third threshold value and a delta backup of the database service is instructed in an instance the number of data units changed since the last complete backup is less than the third threshold; and
issuing, in response to the determination, an instruction to the database service to execute the determined type Of backup.

9. The method of claim 8, wherein the processor is further configured to execute the processor-executable program code in order to cause the system to query the database service for the information indicating metrics regarding backups for the database service.

10. The method of claim 8, wherein the determination of the type of backup strategy to instruct the database service to perform is executed in advance of an execution of a data backup of the database service.

11. The method of claim 8, wherein the determination of the type of backup strategy to instruct the database service to perform is adjusted in response to a varying workload of the database service.

12. The method of claim 8, wherein the information indicating metrics regarding backups for the database service query is representative of an actual state of the database service.

13. The method of claim 8, wherein the determination of the type of backup strategy to instruct the database service to perform is further based on a time to complete a recovery process for the database service.

14. A non-transitory, computer readable medium storing instructions, which when executed by at least one processor cause a computer to perform a method comprising:
receiving, from a database service executing on a cloud infrastructure, information indicating metrics regarding backups for the database service;
determining, based on an analysis of a combination of the received information, a type of backup strategy to instruct the database service to perform, the analysis including:
determining, based on an indication of an age of a last complete backup for the database service, whether to instruct the database service to perform a complete backup of the database service, where a complete backup of the database service is instructed in an instance the age of the last complete backup is greater than a first threshold;
in an instance the age of the last complete backup is not greater than the first threshold, determining, based on a ratio of a total data size of a database of the database service and a size of changed data since the last complete backup, whether to instruct the database service to perform a delta backup of the database service, where a delta backup of the database service is instructed in an instance the ratio is less than a second threshold; and
in an instance the ratio is greater than the second threshold, determining, based on an indication of a number of data units changed since the last complete backup, whether to instruct the database service to perform, where a complete backup of the database service is instructed in an instance the number of data units changed since the last complete backup is greater than a third threshold value and a delta backup of the database service is instructed in an instance the number of data units changed since the last complete backup is less than the third threshold; and
issuing, in response to the determination, an instruction to the database service to execute the determined type of backup.

15. The medium of claim 14, wherein the processor is further configured to execute the processor-executable program code in order to cause the system to query the database service for the information indicating metrics regarding backups for the database service.

16. The medium of claim 14, wherein the determination of the type of backup strategy to instruct the database service to perform is executed in advance of an execution of a data backup of the database service.

17. The medium of claim 14, wherein the determination of the type of backup strategy to instruct the database service to perform is adjusted in response to a varying workload of the database service.

18. The medium of claim 14, wherein the information indicating metrics regarding backups for the database service query is representative of an actual state of the database service.

19. The medium of claim 14, wherein the determination of the type of backup strategy to instruct the database service to perform is further based on a time to complete a recovery process for the database service.

\* \* \* \* \*